United States Patent [19]

Dusel et al.

[11] Patent Number: 4,521,946
[45] Date of Patent: Jun. 11, 1985

[54] CUTTER AND BELT TYPE CONVEYOR FOR WIRE SEGMENTS

[75] Inventors: Robert O. Dusel, Brookfield; Gerald E. Blaha, Waukesha, both of Wis.

[73] Assignee: Artos Engineering Company, New Berlin, Wis.

[21] Appl. No.: 572,984

[22] Filed: Jan. 23, 1984

Related U.S. Application Data

[62] Division of Ser. No. 363,968, Mar. 31, 1982, Pat. No. 4,502,586.

[51] Int. Cl.³ .............................................. H01R 43/04
[52] U.S. Cl. .................................. 29/33 M; 29/38.9; 29/564.1; 29/564.4
[58] Field of Search ............... 29/563, 564, 566.1, 29/38.9, 33 M, 564.1, 564.4, 564.7, 564.6, 564.8; 81/9.51

[56] References Cited

U.S. PATENT DOCUMENTS

| | | | |
|---|---|---|---|
| 3,267,506 | 8/1966 | Scharf | 29/564.4 |
| 3,636,610 | 1/1972 | Williams | 29/38.9 |
| 3,769,681 | 11/1973 | Eubanks | 29/564.4 |
| 4,007,908 | 5/1978 | Fusco | 29/564.4 X |
| 4,175,316 | 11/1979 | Gudmestad | 29/564.6 X |
| 4,194,281 | 3/1980 | Gudmestad | 29/564.4 X |
| 4,411,608 | 10/1983 | Yanagisawa | 29/564.4 |

Primary Examiner—William R. Briggs
Attorney, Agent, or Firm—James E. Nilles

[57] ABSTRACT

A belt type conveyor is provided for conveying segments of wire cut from a continuous strand by a cutting machine to other wire processing machines, such as terminal attachment machines or the like. The conveyor comprises a pair of endless flexible belts supported one above the other by pulleys and guide rails so that the upper flight in the lower belt closely confronts the lower flight in the upper belt whereby wire segments entrapped between the flights are movable along the path of travel of the confronting flights. Each wire segment is disposed so that its axis is perpendicular to the path of travel of the flights and the ends of the segment extend beyond the sides of the flights so as to be accessible to the processing machines. A drive mechanism drives the confronting flights in steps or increments in the same direction and at the same speed. The belts and guide rails are constructed so that the confronting flights are biased toward each other to ensure a firm grip on the wire segments. A mechanism is provided to periodically separate the infeed ends of the confronting flights to enable insertion of a wire segment therebetween.

3 Claims, 18 Drawing Figures

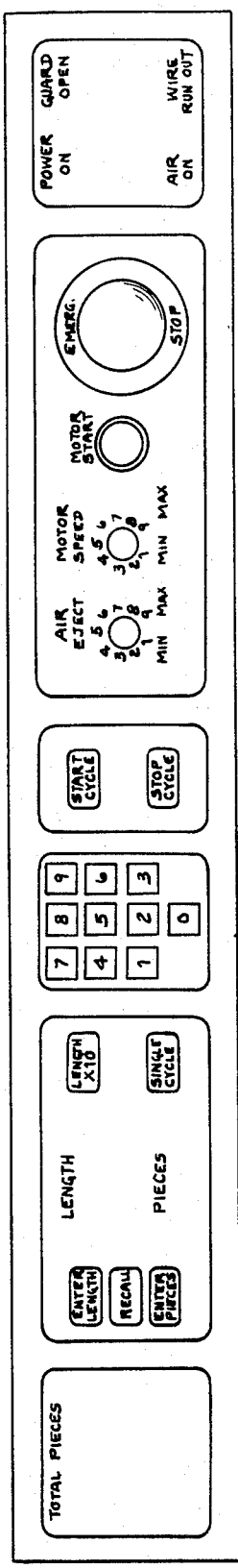

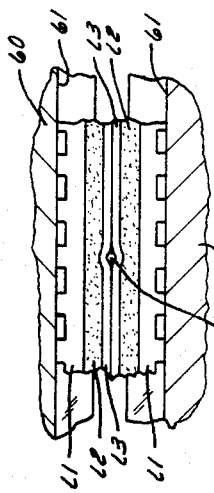
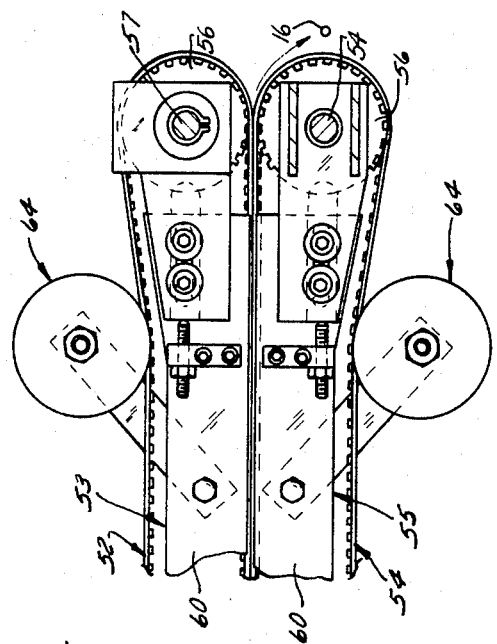
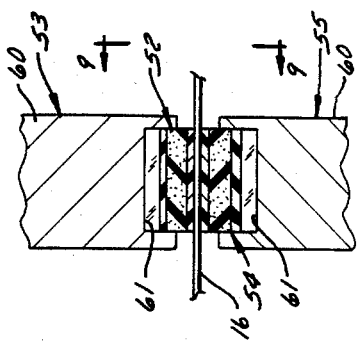
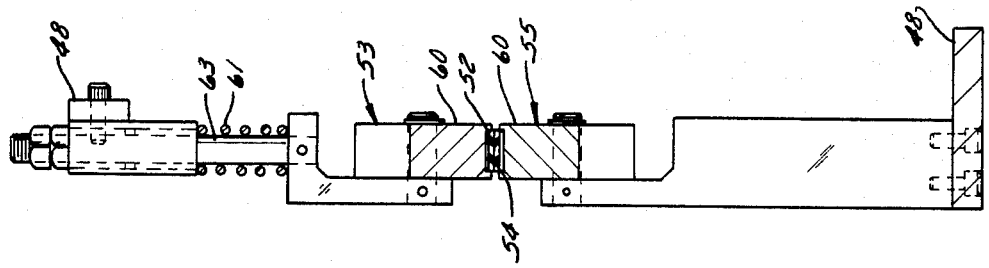
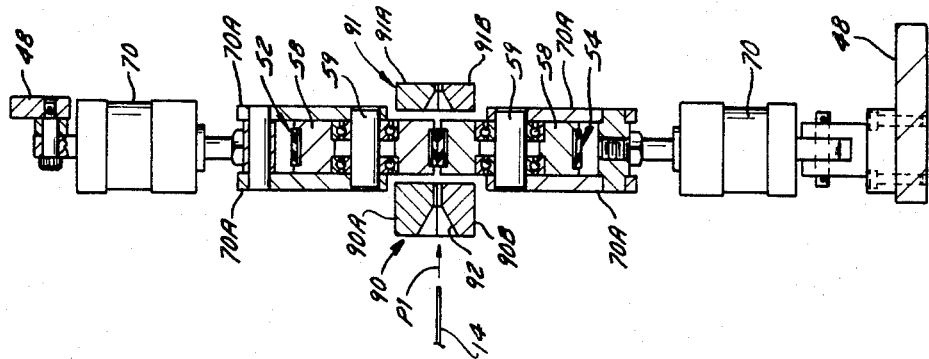

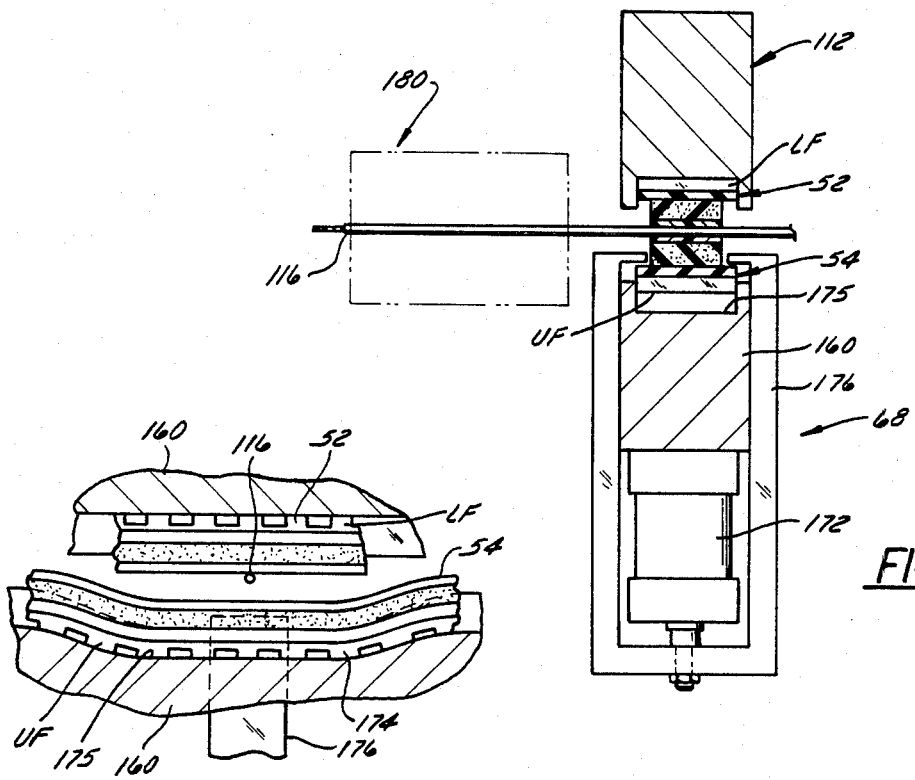
FIG. 16
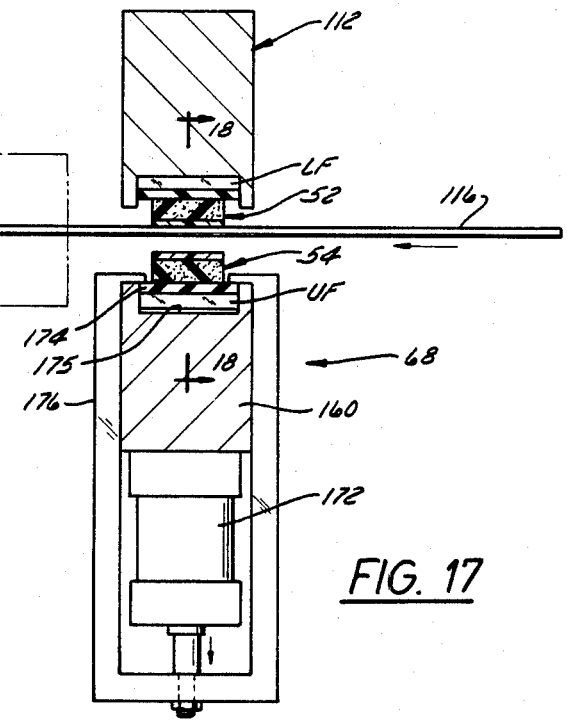
FIG. 18
FIG. 17

CUTTER AND BELT TYPE CONVEYOR FOR WIRE SEGMENTS

This application is a division of application U.S. Ser. No. 363,968 filed Mar. 31, 1982, which issued on Mar. 5, 1985, as U.S. Pat. No. 4,502,586.

BACKGROUND OF THE INVENTION

1. Field of Use

This invention relates generally to a combined wire cutting machine and belt-type conveyors for conveying cut wire segments to wire processing machines which perform various operations thereupon.

2. Description of the Prior Art

Many industries manufacture products using electrical wire leads which take the form of cut segments of insulated wire, either stripped at one or both ends, and then tinned or provided with terminals at one or both of the stripped ends. The wire segments used in such leads are typically manufactured on a high speed lineal feed cutting and stripping machine which cuts the segments from a continuous strand of wire moving along a path. Cutting and stripping usually occur simultaneously. In some cases, the segments are discharged into a collection container. In other cases, the cut and stripped wire segments are individually siezed and transported by a conveyor from the cutting and stripping machine to other wire processing machines which perform operations such as tinning, twisting, terminal attachment and so forth. Some prior art conveyors employ an endless chain reeved around longitudinally spaced apart sprockets and the chain is provided at intervals therealong with wire gripping devices or jaws which close and open automatically at appropriate intervals to grip and then subsequently release the wire segments to be conveyed. Relatively complex mechanisms are required to operate the jaws. Such prior art conveyors present certain problems. For example, moving metal parts in the chain, jaws and operating mechanisms are subject to wear and mechanical breakdown. Further, the mass and operational characteristics of the chain and associated components impose upper limits on conveyor speed. Also, the wire gripping devices or jaws can damage the insulation of the wire section held thereby, resulting in an unsightly product or one prone to subsequent electrical failure. Efforts to line the jaws with protective surface materials add to the cost and complexity of the conveyor and its maintenance.

SUMMARY OF THE PRESENT INVENTION

In accordance with the present invention there is provided a belt type conveyor for conveying segments of wire cut from a continuous strand by a cutting machine, or a combined cutting and stripping machine, to other wire processing machines, such as tinning machines or terminal attachment machines or the like. The conveyor comprises a pair of endless flexible belts supported one above the other by belts support means including pulleys and guide rails so that the upper flight in the lower belt closely confronts the lower flight in the upper belt whereby wire segments entrapped between the flights are movable along the path of travel of the confronting flights from the infeed end to the output end of the conveyor. Each wire segment is disposed so that its axis is perpendicular to the path of travel of the flights and the ends of the segment extend beyond the sides of the flights so as to be accessible to processing machines which are located on either or both sides of the conveyor. A drive means or mechanism drives the confronting flights in steps or increments in the same direction and at the same speed. The belts and guide rails are constructed so that the confronting flights are biased toward each other to ensure a firm grip on the wire segments. In particular, at least one belt (but preferably both) comprises a first layer of resilient material engageable with the wire segments, a second layer of compressible material bonded to the first layer, and a third layer bonded to the second layer and having timing teeth formed therein for engagement with complementary teeth in the belt drive sprocket. Means are provided to periodically separate the infeed ends of the confronting flights to enable insertion of a wire segment therebetween. Such means include pivotably movable portions on the infeed ends of the guide rails and pneumatic cylinders for moving the portions. In one embodiment, separator means are provided to periodically separate the confronting flights at some location between the infeed and outfed ends thereof so as to enable a wire shifter means to cause a wire segment to be shifted axially relative to the temporarily separated confronting flights to suit the position of processing machines along the conveyor on one side or the other thereof. Such separator means include a depression in one of the guide rails at the said location, a belt gripper member engageable with the belt edges, and a pneumatic cylinder operable to move the belt gripper and move the belt into the depression. Such wire shifter means include separable driven rollers engageable with a wire segment to move it axially.

An improved conveyor in accordance with the invention offers numerous advantages over the prior art, including a simpler, less costly and more reliable structure capable of operation at higher speeds and less prone to breakdown or maladjustment. The improved conveyor can handle single or multi-stranded wire segments of various lengths and can accommodate or provide for variously sized spacing between adjacent segments. The improved conveyor tightly grips wire segments being moved thereby to ensure accuracy during processing but imposes no damage on the segments while doing so. The improved conveyor enables wire segments to be shifted axially to other positions as system requirements dictate. Other objects and advantages of the invention will hereinafter appear.

DRAWINGS

FIG. 2 is an enlarged front elevation view of the machine shown in FIG. 1;

FIG. 3 is an enlarged front elevation view of the control panel of the machine shown in FIGS. 1 and 2;

FIG. 5 is a view of the discharge end of the conveyor taken on line 5—5 of FIG. 13;

FIG. 6 is a cross-section view taken on line 6—6 of FIG. 4;

FIG. 7 is a cross-section view taken on line 7—7 of FIG. 4;

FIG. 8 is a greatly enlarged cross-section view taken on line 8—8 of FIG. 4;

FIG. 9 is a cross-section view taken on line 9—9 of FIG. 8;

FIG. 16 is an enlarged cross-section view taken on line 16—16 of FIG. 15 and showing certain conveyor components in wire-gripping position;

FIG. 17 is a view similar to FIG. 16 but showing the said components in a wire-releasing position; and FIG. 18 is an enlarged cross-section taken on line 18—18 of FIG. 17.

DESCRIPTION OF PREFERRED EMBODIMENTS

Figure 1:
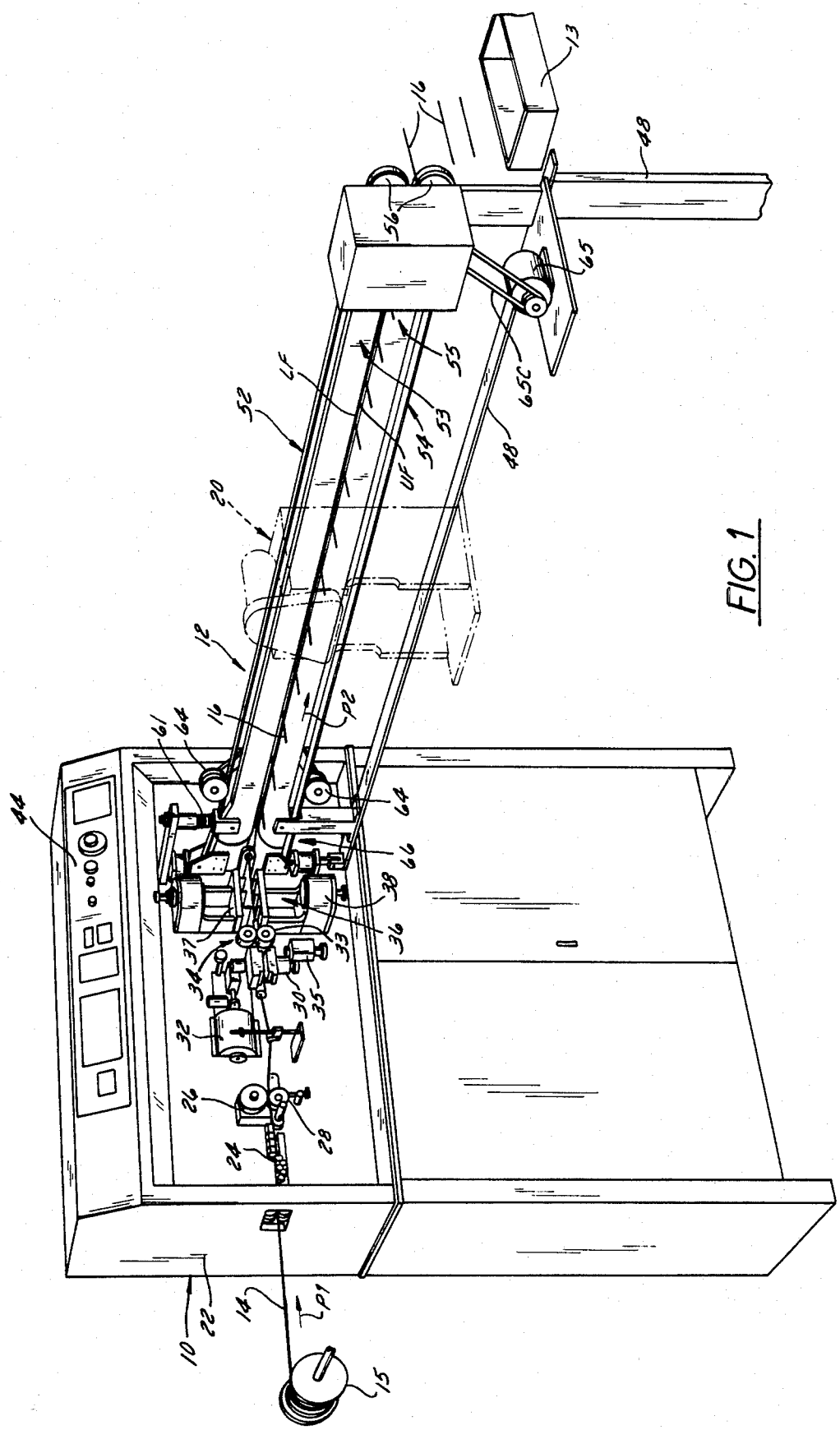
FIG. 1 is a perspective view of a wire cutting and stripping machine and a belt conveyor therefor in accordance with the present invention.
Figure 4:
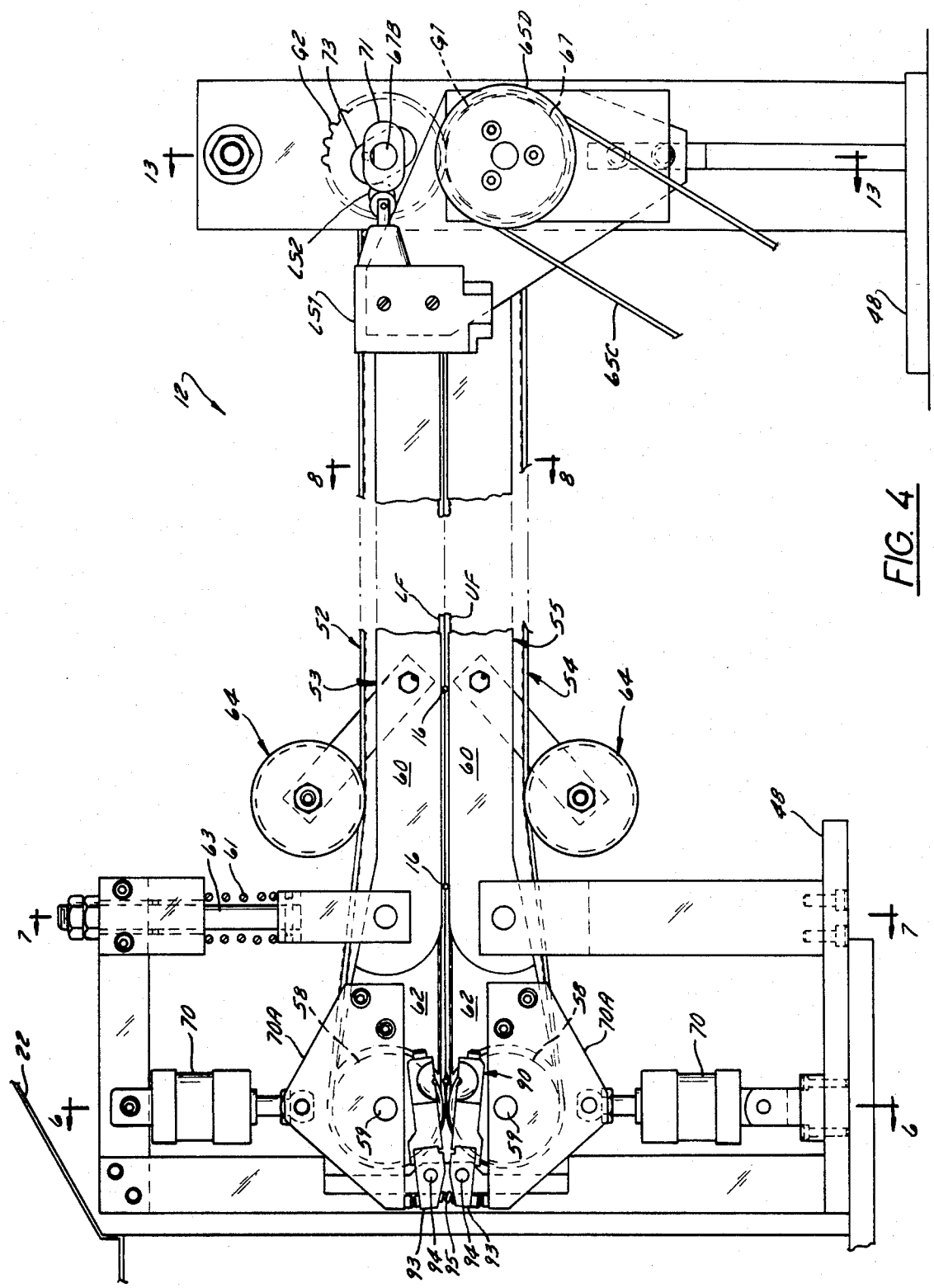
FIG. 4 is a greatly enlarged side elevation view, with portions broken away of one side of the conveyor shown in FIG. 1.
Figure 10:
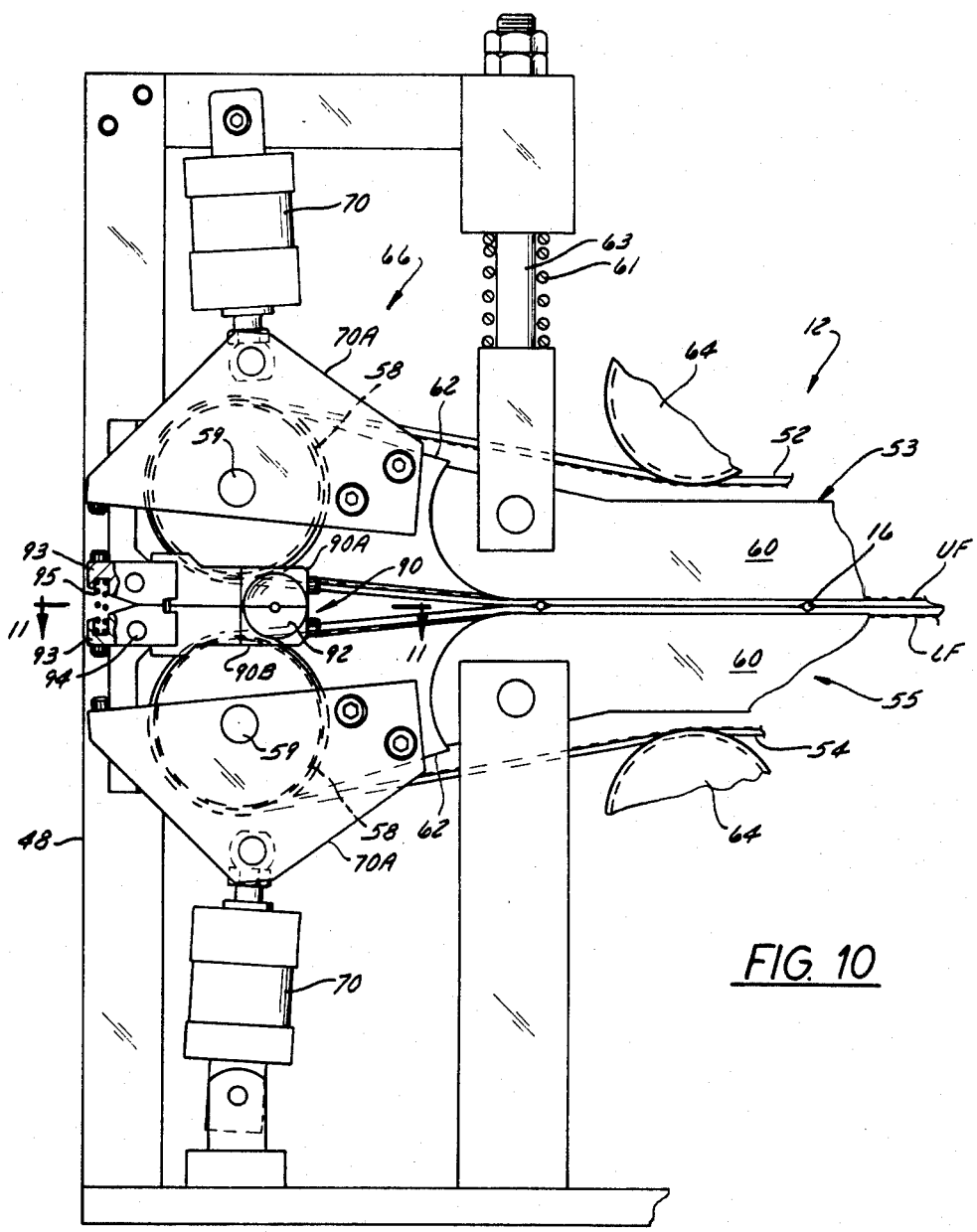
FIG. 10 is an enlarged side elevation view of the infeed end of the conveyor shown in FIG. 4 and showing portions thereof in open or wire receiving position.
Figure 11:
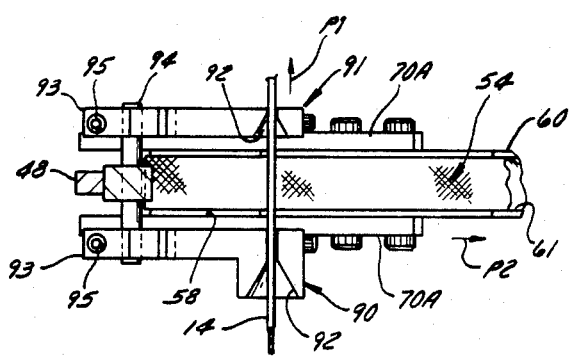
FIG. 11 is a view taken on line 11—11 of FIG. 10.
Figure 12:
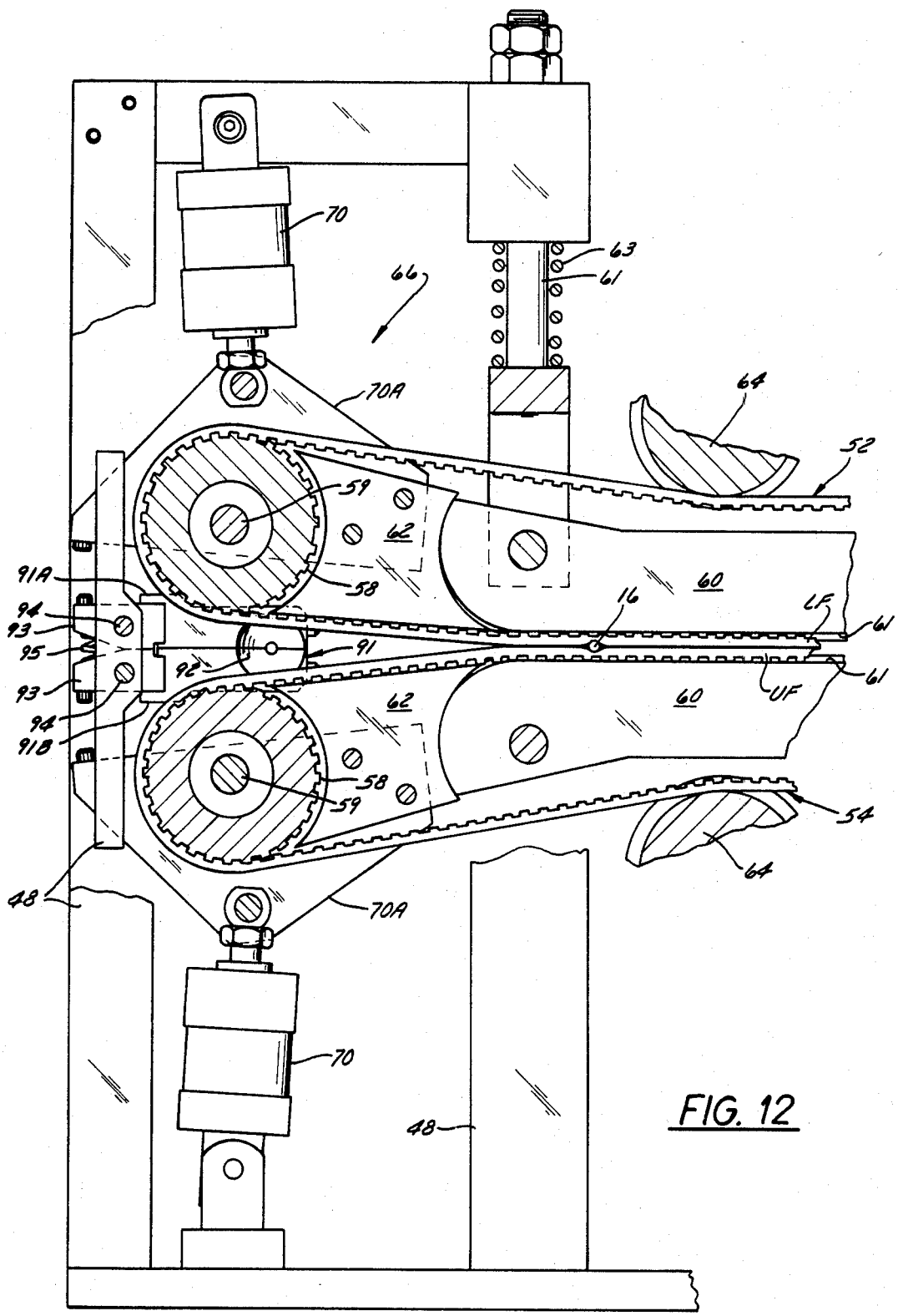
FIG. 12 is an enlarged view partly in section and similar to FIG. 10.
Figure 13:
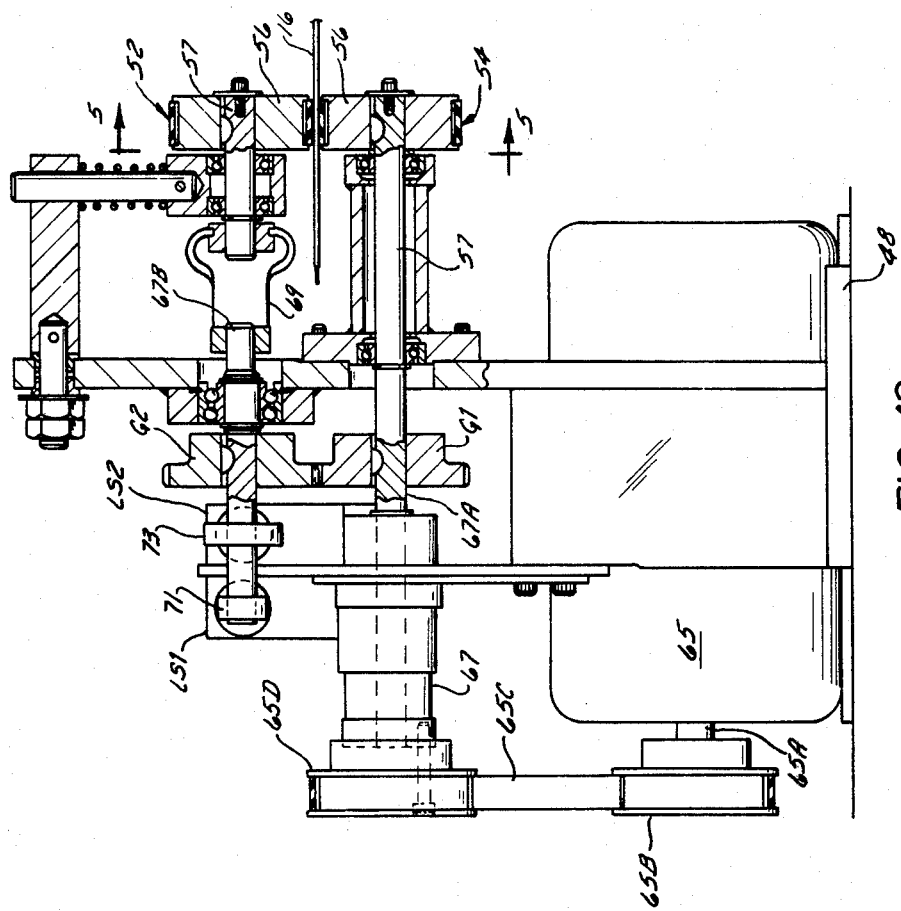
FIG. 13 is an end elevation view, partly in cross-section, of the discharge end of the conveyor shown in FIG. 4.

Referring to FIG. 1, there is shown a system comprising a coil 15 for supplying a continuous strand 14 of insulated wire along a path P1, a wire cutting and stripping machine 10 for cutting the strand into wire segments 16 having stripped ends, a belt type conveyor 12 for receiving the segments 16 and conveying them in spaced apart relationship and in incremental steps along a path P2 (transverse to path P1) for further processing by one or more processing machines, such as terminal attachment machine 20, located along-side conveyor 12 and for finally discharging the finished segments 16 into a container 13. Each segment 16 has its axis disposed transversely to path P2 as it moves therealong and at least one end, but preferably both ends, of the segment extend beyond the sides of conveyor 12 so as to be accessible to the processing machine such as 20.

Figure 14:
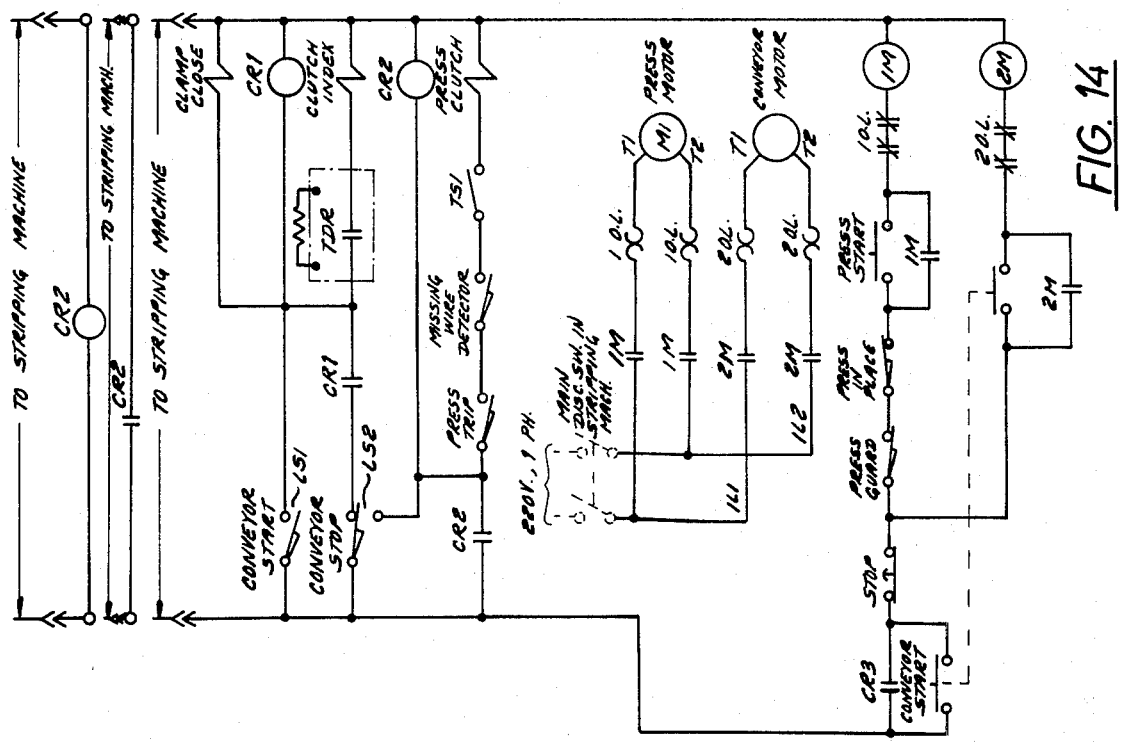
FIG. 14 is an electric circuit diagram which forms part of the electrical control system of the conveyor.

As FIGS. 1, 2 and 3 show, machine 10 generally comprises a supporting cabinet 22; a wire straightener 24; a measuring and encoder wheel 26 and its associated positionable pressure wheel 28; a stripping clamp 30 and an actuatable stripping cylinder 32 therefor; a drive assembly 34 comprising a pair of feed wheels 33 and a pneumatic cylinder 35 for wheel separation; a cutter head assembly 36 comprising cutter heads 37 and pneumatic operating cylinders 38 therefor; and a stripping clamp 40 and an actuatable stripping cylinder 43 therefor. The feed wheels are driven by electric motor (FIG. 14) and are opened and closed pneumatically, as are the stripping clamps. Machine 10 may a Model CS-26 machine available from Artos Engineering Company, 15600 West Lincoln Avenue, New Berlin, Wis. 53151, U.S.A., and described in that company's Bulletin No. 980.

It is to be understood that machine 10 further comprises control means which includes a programmable controller (not shown) and a touch type control panel 44 mounted on cabinet 22, as FIGS. 1, 2 and 3 show, and its operation is hereinafter described. Machine 10 is, for example, capable of processing single, double and ribbon-type conductor wire; of cutting wire segments ranging in length from 2 inches to 328 feet; of stripping pieces of insulation ranging in length from ⅛ inches to 1½ inches; and of operating at a maximum in-feed rate of 354 feet per minute. It is to be understood that the programmable control (not shown) contains two 4-digit predetermined counters (not shown) and two 4-digit memories (not shown). The length counter (not shown) totalizes the preset length of wire and the pieces counter (not shown) totalizes the number of wire sections cut. The two memories hold or store the predetermined length and number of pieces to be made.

As FIGS. 1 and 4 through 13 show, conveyor 12, which has an infeed end and a discharge end, generally comprises a supporting framework or structure 48, and has belt support means on the framework for rotatably supporting a pair of intermittently driven endless flexible belts 52 (upper) and 54 (lower) between which the wire segments 16 are inserted and entrapped and by which the segments are conveyed. The belts 52 and 54 are supported so that an upper flight UF on lower belt 54 closely confronts a lower flight LF on upper belt 52. The belt support means comprise upper and lower belt support assemblies 53 and 55, respectively. Each belt assembly 53, 55 comprises an elongated main guide rail 60. Lower guide rail 60 is rigidly secured to the framework 48. Upper guide rail 60 is adjustably positionable by a bolt 63 and biased downwardly on framework 48 by a spring 61. Each belt assembly 53, 55 also comprises a pivotably movable guide rail end portion 62 which is forced against the infeed end of its guide rail 60 by the belt 52 or 54.

Each guide rail 60 rotatably supports a drive pulley or sprocket 56 at its discharge end by means of an axle 67A or 57. Each guide rail end portion 62 rotatably supports an idler pulley or sprocket 58 by means of an axle 59. Four tensioning pulley assemblies 64 are provided for the belts 52, 54.

As FIGS. 8 and 9 best show, each guide rail 60 (and each guide rail end portion 62) includes a slot or groove 61 in which its associated belt rides. Furthermore, each belt 52, 54 is constructed and disposed on its rail so that the confronting flights UF and LF are biased toward and into engagement with each other so as to ensure that the wire segments 16 are firmly gripped therebetween. Each belt 52, 54 comprises a notched sprocket-engaging layer L1 constructed of vulcanized fiber, for example; an easily compressible middle layer L2 formed of sponge rubber or the like and bonded to layer L1; and an easily compressed outer wire-segment engaging layer L3 bonded to layer L2 and formed of gum rubber or similar material such as urethane or Buna N material.

Means are provided for driving the belts 52, 54 so that the confronting flights UF and LF move simultaneously at the same speed and in the same direction along path P2 in steps or increments and convey the wire segments 16 entrapped therebetween to the processing machine 20 and subsequently to the discharge container 13. Such means include an electric motor 65 which, as FIG. 13 best shows, has a shaft 65A which drives a pulley 65B, a drive belts 65C, and a pulley 65D. Pulley 65D is part of a one-half revolution clutch 67 which is connected to shaft or axle 67A. Shaft 67A directly drives sprocket 56 of lower belt assembly 54 and indirectly drives, through gears G1 and G2, the sprocket 56 of upper belt assembly 52. Gear G2 is mounted on a shaft 67B which is connected by a flexible coupling 69 to axle 57 for upper sprocket 56. Shaft 67B is provided with cams 71 and 73, shown in FIGS. 4 and 13, for operating limit switches LS1 and LS2, respectively, which are also shown in the circuit diagram of FIG. 14. In operation, motor 65 operates continually but clutch 67 repeatedly engages and disengages in synchronism with the operation of cutter and stripper machine 10 so that the belts 52, 54 are stopped while a wire segment 16 is received therebetween and then start up to move the wire segment a predetermined distance, whereupon the belts again stop.

Separator means are provided to selectively (and periodically or intermittently) separate the confronting flights UL, LF at a location therealong to facilitate axial movement of a wire segment 16 between the confronting flights. More specifically, as FIGS. 1, 4, 6, 10 and 12 show, in all embodiments disclosed herein, a separator means 66 periodically separates the confronting flights UF and LF at the infeed end of the conveyor to facilitate initial insertion of a wire segment 16 between the confronting flights for transport by the conveyor 20. The separator means 66, shown closed in FIGS. 1 and 4 and open in FIGS. 10 and 12, includes pneumatic cylinders 70 attached between framework 48 and the movable guide rail portions 62 to move the portions 62 of the guide rails, thereby moving the idler pulleys 58 thereon and a portion of the associated confronting belt flights away from one another.

Means are provided for facilitating insertion of a cut and stripped wire segment 16 between the infeed ends of the flights UF and LF while they are separated. As FIGS. 1, 2, 4, 6, 10, 11 and 12 show, such means include an inlet funnel or wire guide 90 and an outlet funnel or wire guide 91. Both funnels 90 and 91 have a tapered hole 92 therethrough which are aligned with the path P1 of the wire strand 14. The funnels 90 and 91 have separable upper and lower sections 90A, 90B and 91A, 91B, respectively, and each section is connection to a pivot arm or beam 93 which is pivotally mounted on framework 48 by a pivot pin 94. A biasing spring 95 is disposed between each pair of upper and lower pivot arms 93. As comparison of FIGS. 4, 6 and 11, 12 makes clear, when the pneumatic cylinders 70 are extended to effect closure of the guide rail sections 62 (as is the condition when the belts 52, 54 are moving), the plates 70A which connect the cylinders 70 to the rail sections 62 bear against the outer ends of the pivot arms 93 and cause the funnel sections in the funnels 90 and 91 to separate. Such separation affords clearance for transport of the wire segment 16 from between the funnel section by the belts 52, 54. Conversely, when the cylinders 70 are retracted, and the guide rail sections 62 are open (as is the condition when the belts 52, 54 are stopped and wire strand 14 is being fed into the funnels 90 and 91 prior to severance of a segment 16), the spring 95 acts on the associated pair of lever arms 93 to maintain the funnel sections closed.

Figure 15:
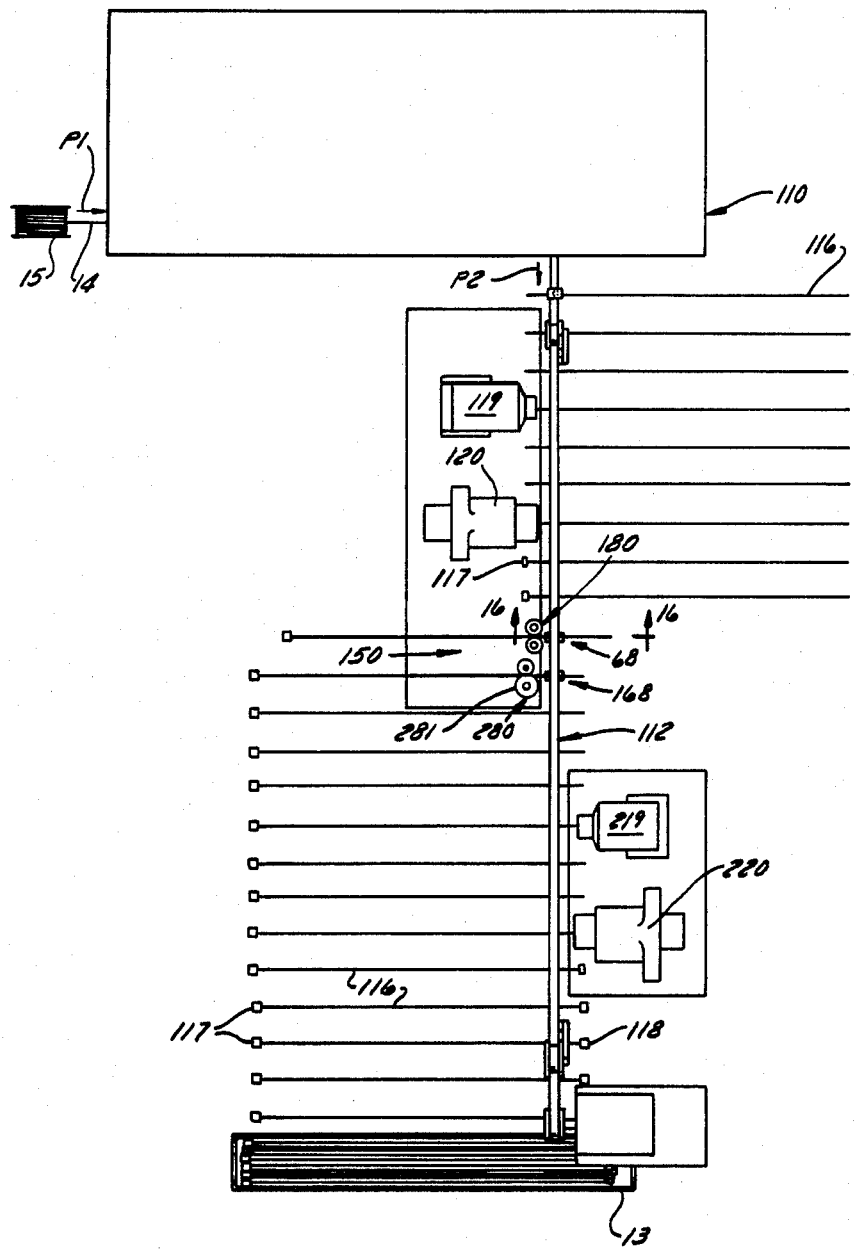
FIG. 15 is a schematic top plan view of another embodiment of the conveyor.

Referring now to FIG. 15, there is shown another system comprising a coil 15 for supplying a continuous strand 14 of insulated wire along a path P1, a wire cutting machine 110 similar to that hereinbefore described for cutting the strand into relatively long wire segments 116 having unstripped ends, a belt type conveyor 112 for receiving the segments 116 and conveying them in spaced apart relationship and in incremental steps along a path P2 (transverse to path P1) for further processing by several processing machines, such as a stripping machine 119 and terminal attachment machine 120, located along one side of conveyor 112 and another stripping machine 219 and terminal attachment machine 220 located on the other side of conveyor 112 and for finally discharging the finished segments 116 into a container 13. Each segment 116 has its axis disposed transversely to path P2 as it moves therealong and initially one end of the segment extends only a short distance beyond one side of conveyor 112 so as to be accessible to the processing machines 119 and 120. Then, after attachment of the terminal 117, the wire segment is shifted to facilitate attachment of the other terminal 118.

Machine 110 is similar to machine 10 hereinbefore described except that it does not include insulation stripping means because such processing step is carried out externally of machine 110 by the stripping machines 119 and 219 shown in FIG. 15. Conveyor 112 is similar to conveyor 12 hereinbefore described except that it includes means for separating the confronting flights UF and LF at a location intermediate the ends of the conveyor so that the wire segments can be axially moved or shifted by a wire shifting means from the position shown in the upper portion of FIG. 15 to the position shown in the lower portion of FIG. 15. Since the wire segments 116 in FIG. 15 are relatively long they are first gripped near one end by the conveyor 112 and the processing machines 119 and 120 act upon those ends to apply terminals 117 thereto. After the segments 116 are shifted one at a time, the other end of each segment is in a position to be acted upon by the other processing machines 219 and 220 to have terminals 118 applied thereto.

The means for separating the flights UF and LF and the shifting means are embodied in a mechanism 150 shown in FIG. 15. The separator means 68, shown in FIGS. 16, 17 and 18, periodically separates the confronting flights UF and LF at a first location between or intermediate the infeed and discharge ends of the conveyor 112 to facilitate major axial shifting of the wire segment 116 already being transported between the confronting flights by a first pair of rollers 181 to properly position the segment relative to the processing machines 219 and 220 which are located alongside the conveyor 112 on opposite sides thereof. Preferably, a second separator means 168 and an associated second pair of rollers 281 are provided downstream of separator means 68 and the rollers 181 to very accurately finally position or "fine tune" the ends of the wire segment 116 relative to the machines 219 and 220.

The first and second separator means 68 and 168 each include a pneumatic cylinder 172, to move at least a portion 174 of its associated confronting flight UF away from the other confronting flight LF. Each separator means 68, 168 further includes a depression 175 in the lower guide rail 160 and means such as a bracket 176 movable by means of pneumatic cylinder 172 and engageable with the associated confronting flight UF of lower belt 54 to move the latter into the depression 175 whereby segment 116 is free to be shifted axially.

The first and second shifter means 180 and 280 each include the pair of rollers 181 and 281, respectively, which are rotatable by means of a motor (not shown), which are also able to be raised and lowered vertically into and out of alignment with a wire segment 116 by means of a mechanism (not shown), and which are also movable toward and away from each other when raised by means of a pneumatic cylinder (not shown) into and out of engagement, respectively, with the wire segment 116 which is to be moved. As stated, the first rollers 181 effect the major axial movement of a segment 116. In order to ensure that the end of the wire segment is accurately placed relative to the processing machines 219 and 220, the second pair of rollers 281 are provided to axially move the wire segment 116 slowly and accurately to its final axial position. Each wire segment 116 is transported from the rollers 181 to the rollers 281 by the flights UF and LF which are in reclosed or closely confronting condition in the space between the first and second pairs of rollers.

OPERATION

Referring to FIG. 3 wherein the manually operable touch type control switches are shown and labelled, when the Main Power switch is turned on, both counters and memory reset to zero and the control is in the stop mode. Pressing and holding the Enter Length switch allows the operator to program the length of pieces to be made via the ten digit numerical keyboard. While the Enter Length switch is held, the predetermined length of wire strand to be cut appears on the LENGTH display. Pressing and holding the Enter Pieces switch allows the operator to program the number of pieces to be cut. While the Enter Pieces switch is held, the predetermined number of pieces appears on the PIECES display. The programmable controller (not shown) can be programmed only while in the stop mode.

When the Power On switch is turned on, the counters and memory reset to zero, the feed wheels of drive assembly 34 open, the drive motor (not shown) therefor is stopped, and the main air solenoid (not shown) is on. After the controller has been programmed, pressing the Start Cycle switch actuates air cylinder 35 and to close the feed rollers 33. Pressing the Motor Start switch and adjusting the Motor Speed control starts the feed motor (not shown) for the rollers 33. As the wire strand 14 is fed through the machine 10 and wire sections 16 are cut therefrom, a count of pieces cut will totalize on the LENGTH display. When the count on the LENGTH display matches the predetermined length of wire strand to be cut, and the number of pieces display matches the predetermined number of pieces, the controller stops machine 10 with the feed rollers 33 in the open position. The machine 10 is then readied for the next operation.

Assume that machine 10 is in operation as hereinbefore described and that a strand 14 of wire is moving therethrough. Also assume that the strand has entered the funnels 90 and 91, which are in closed condition, and that the guide rail portions 62 are open. At this point the belts 52 and 54 are stopped. Machine 10 then effects a cutting and stripping operation on strand 14 to provide a segment 16, which segment is disposed in funnels 90 and 91. At this stage, the control system in machine 10 effects actuation of the pneumatic cylinders 70 to cause the guide rail infeed end portions 62 to close. At the last portion of such closing of the guide rails 62, the sections 90A and 90B of each funnel 90 and 91 open. Also, simultaneously therewith, the guide rail portions 62 come together carrying the flights UF and LF therewith which grip the wire segment 16 therebetween. Conveyor clutch 67 then operates through one-half revolution and causes the belts 52 and 54 to advance for a predetermined distance thereby moving the wire segment 16 the same distance. The aforedescribed procedure is repeated until a consecutive series of wire segments 16 are in the conveyor and each segment is presented in order to the wire processing machine 20, which, for example, affixes a terminal (not shown) thereto while the conveyor belts 52 and 54 are stopped. After this, the finished piece is carried by the conveyor 12 and discharged from the end thereof into the container 13.

It is to be understood that the time intervals required to carry out the cutting and stripping operation, the conveying operation, and the terminal attachment operation are coordinated by means of the control system embodied in the machine 10 to which the conveyor 12 is connected for necessary control functions.

As regards the embodiment of the invention shown in FIGS. 15 through 18, the operation is as follows. The conveyor 112 receives a wire segment 116 from the wire cutting machine 110 in the manner already described in connection with machine 10 and conveyor 12. As FIG. 15 shows, each wire segment 116 is relatively long (compared to the segment 16 in the first embodiment) and is gripped fairly close to one end, i.e., the left end of the wire segment 116 with respect to FIG. 15. As the conveyor 112 advances a segment 116 in steps or increments along path P2, the wire segment eventually reaches and is stopped at a stripping machine 119 where one end of the wire segment is stripped. The segment 116 is then advanced to the terminal attachment machine 120 whereat it stops and a terminal 117 is affixed. The wire segment 116 with terminal 117 affixed is then presented to the first separator means 68 and to the first shifter means 180 whereby, as FIG. 15 shows, it is shifted axially leftward for a major distance. The partially shifted segment 116 is then transported by conveyor 112 to the second separator means 168 and the associated second shifter means 280 which cause the segment 116 to be accurately positioned so that the righthand end (with respect to FIG. 15) of the segment is properly positioned with respect to wire stripping machine 219 which is disposed on the opposite side of conveyor 112 from the machines 119 and 120. Wire segment 116 then advances in steps until it is acted upon by stripping machine 219 and terminal attachment machine 120 whereat a terminal 118 is affixed, after which the finished segment is discharged into container 113.

It is to be understood that a wire segment such as 16 could be initially inserted between the confronting flights UF and LF at some position other than the infeed end of conveyor 12, provided such position was provided with a separator means such as 68 and a shifter means such as 180. Preferably, such a shifter means would be provided with funnels such as 90 and 91 to ensure proper wire placement.

It should also be understood that the conveyor belts 52 and 54 could be constructed in some other manner than shown. However, provision of a notched belt, similar to well-known timing belts, ensures very accurate incremental movement of the belts and this ensures proper positioning of the wire segment 16 carried thereby. Those surfaces of the belts 52 and 54 which grip the wire segment 16 should be sufficiently resilient as to ensure they make firm gripping action with the wire segment so as to prevent accidental displacement of the wire segment as it is being carried. It is also noteworthy that the layered construction of the belt, including in particular the cushioning layer, also aids in securely gripping wires of different outside diameters.

We claim:
1. In combination:
   means for cutting a continuous strand of wire moving along a first path into segments;
   and conveyor means for receiving and conveying said segments along a second path transverse to said first path while maintaining each segment so that its longitudinal axis is transverse to said second path;

said conveyor means comprising a driven pair of endless belts having confronting flights movable along said second path;

said conveyor means further comprising means for periodically separating and reclosing a portion of said confronting flights to facilitate reception of a wire segment therebetween for conveyance.

2. A combination according to claim 1 wherein said conveyor means further comprises means for periodically separating and reclosing a portion of said confronting flights between which a wire segment is already entrapped and means for axially shifting said last-recited wire segment while said portion of said confronting flights is separated and said last-recited wire segment is free to move.

3. In combination:

means for cutting a continuous strand of wire moving along a first path into segments;

conveyor means comprising a driven pair of endless belts having confronting flights for receiving and conveying said segments along a second path transverse to said first path while maintaining each segment so that its longitudinal axis is transverse to said second path;

said conveyor means comprising first means for periodically separating and reclosing a portion of said confronting flights to facilitate initial reception of a wire segment therebetween for conveyance;

said conveyor means further comprising second means for periodically separating and reclosing another portion of said confronting flights between which a wire segment is already entrapped;

said conveyor means also comprising shifter means for shifting an untrapped wire segment while said other portion of said confronting flights is separated and said untrapped wire segment is free to move;

and wire processing machines disposed on opposite sides of said conveyor means for operating upon opposite ends of said wire segments.

* * * * *